Sept. 6, 1966  W. A. NADOLSKE ETAL  3,270,921
UNLOADING SYSTEM FOR BULK MATERIAL BINS
Filed Dec. 13, 1963  4 Sheets-Sheet 1
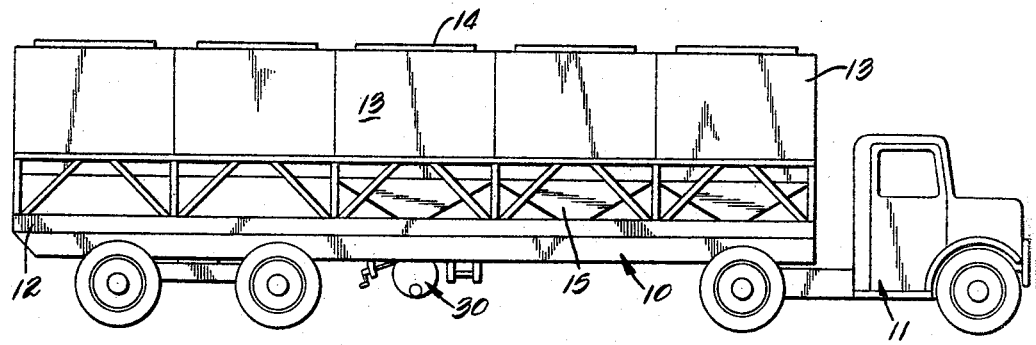
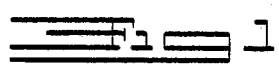
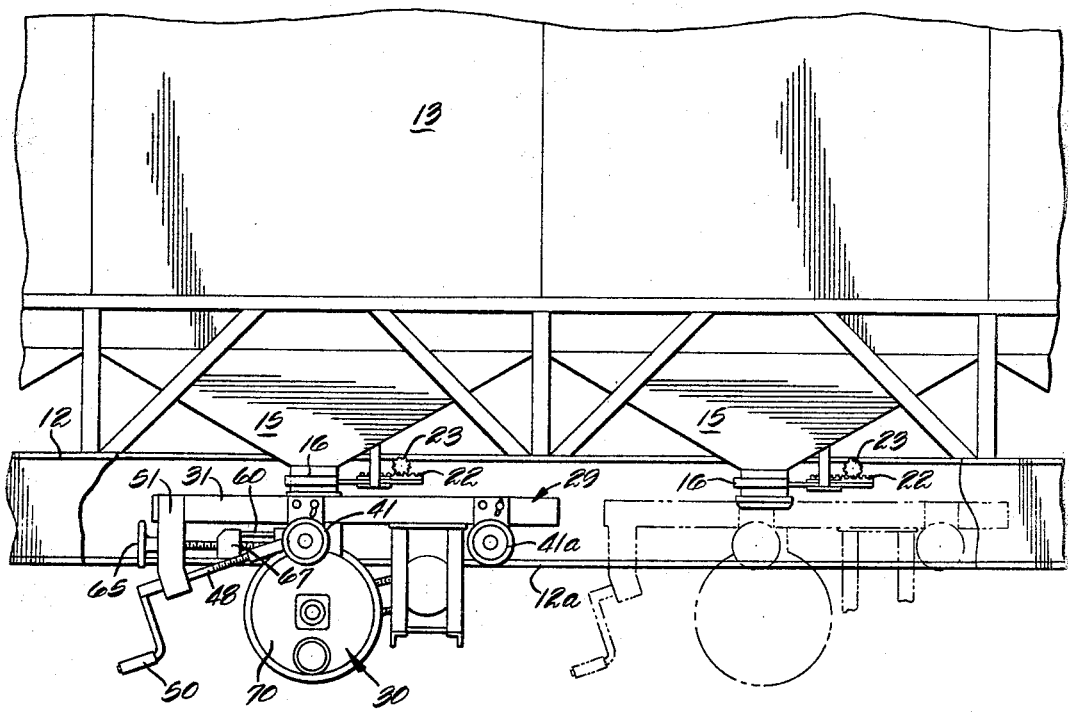
INVENTORS.
WILLIAM A. NADOLSKE
KENNETH E. WILKIN
BY MAHONEY, MILLER & RAMBO
BY *W. S. Rambo*
ATTORNEYS.

Sept. 6, 1966  W. A. NADOLSKE ET AL  3,270,921
UNLOADING SYSTEM FOR BULK MATERIAL BINS
Filed Dec. 13, 1963  4 Sheets-Sheet 2
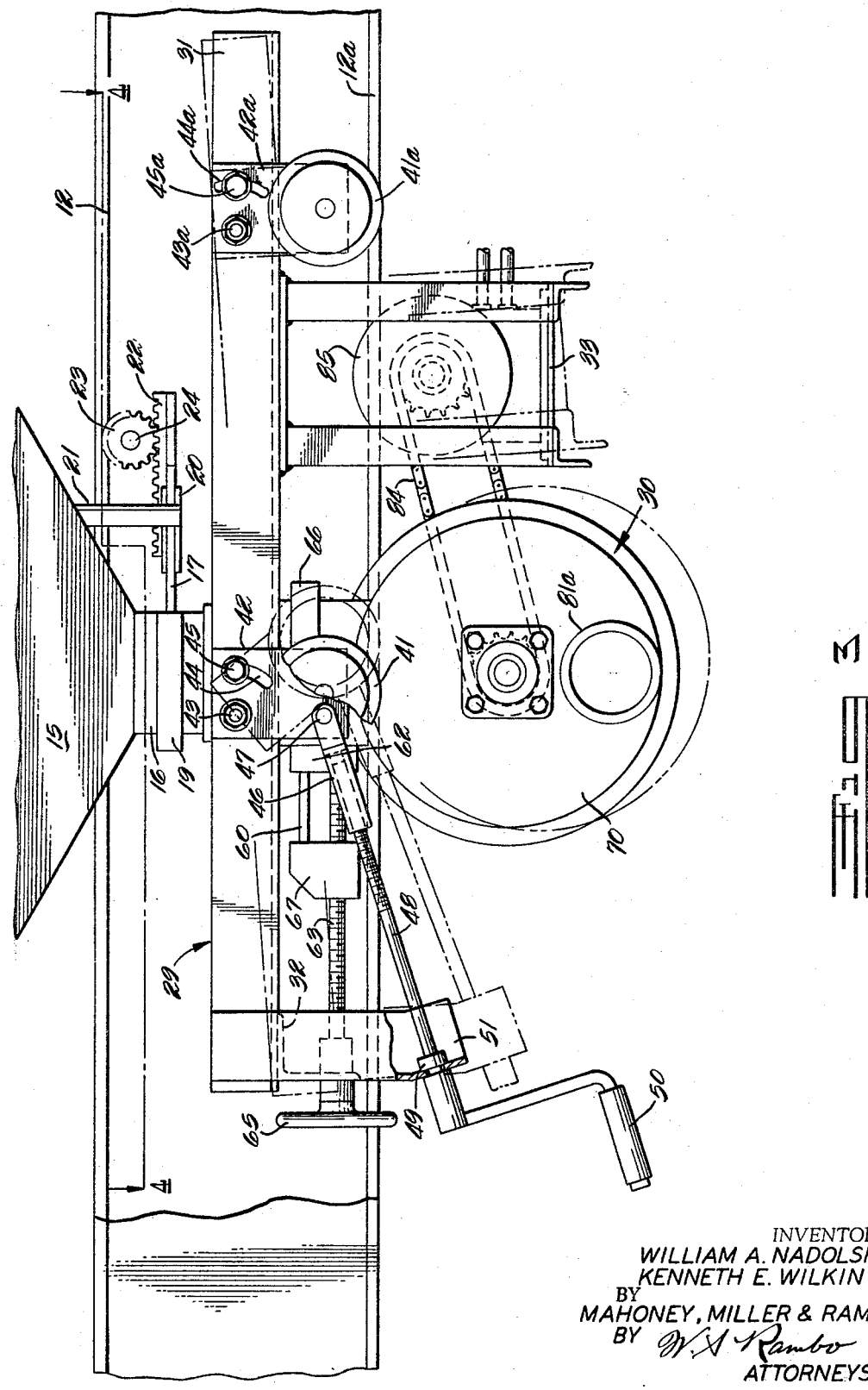
INVENTORS.
WILLIAM A. NADOLSKE
KENNETH E. WILKIN
BY
MAHONEY, MILLER & RAMBO
BY W.A. Rambo
ATTORNEYS.

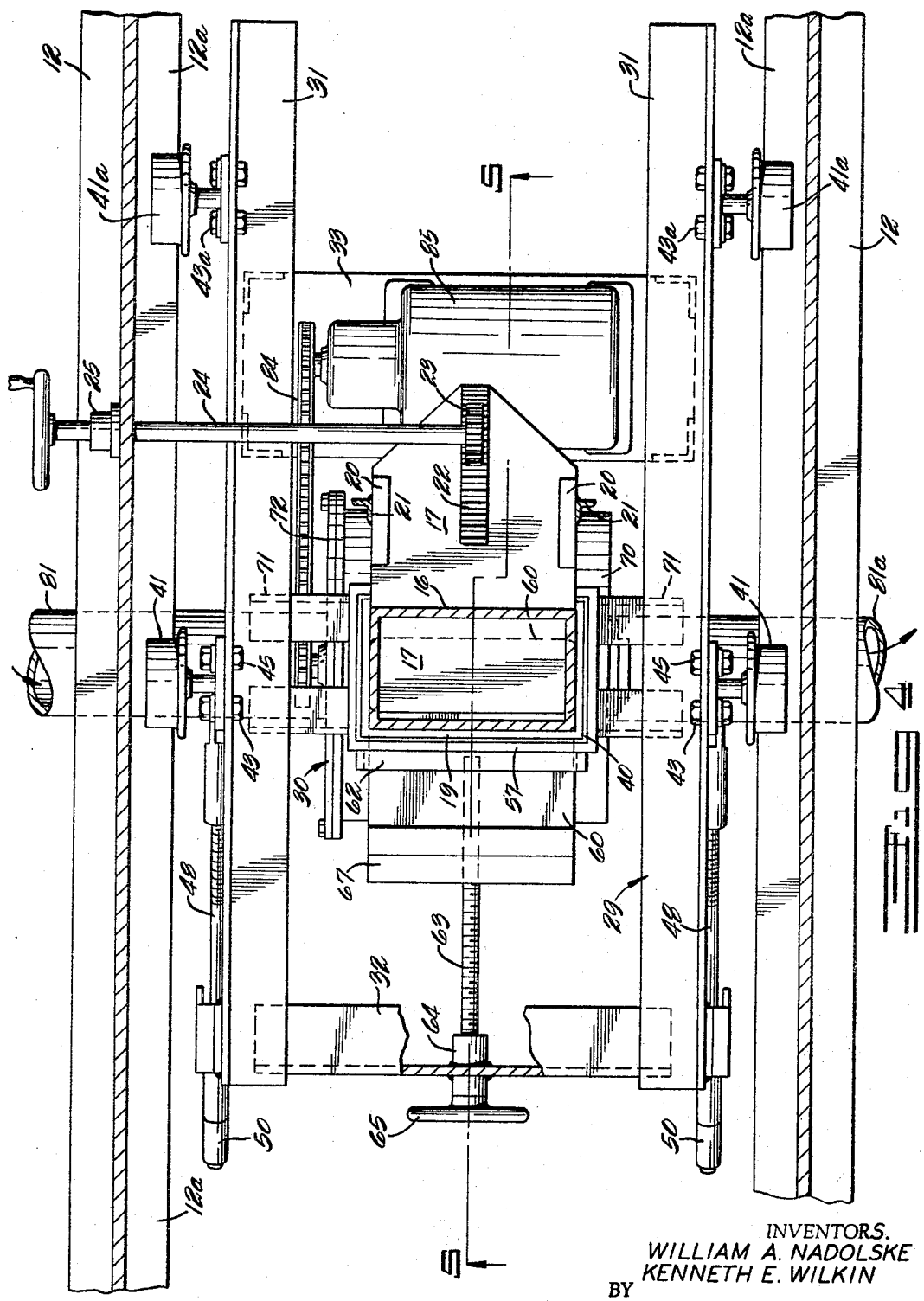

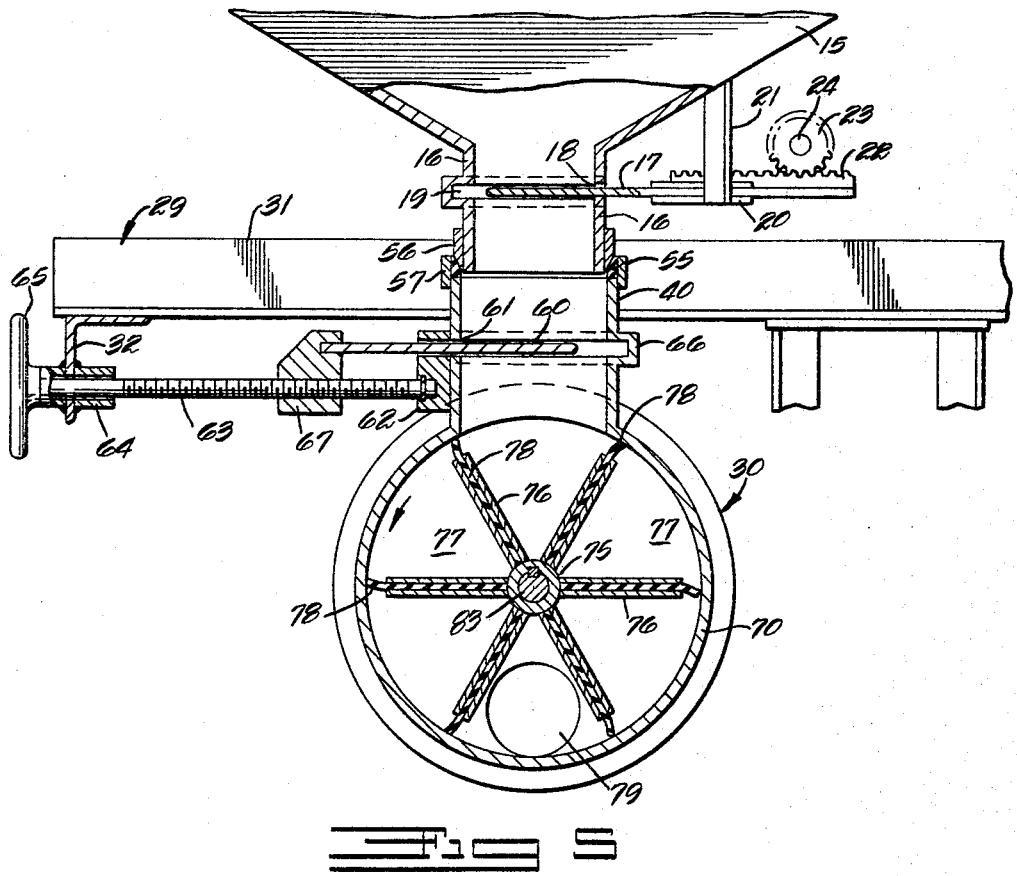
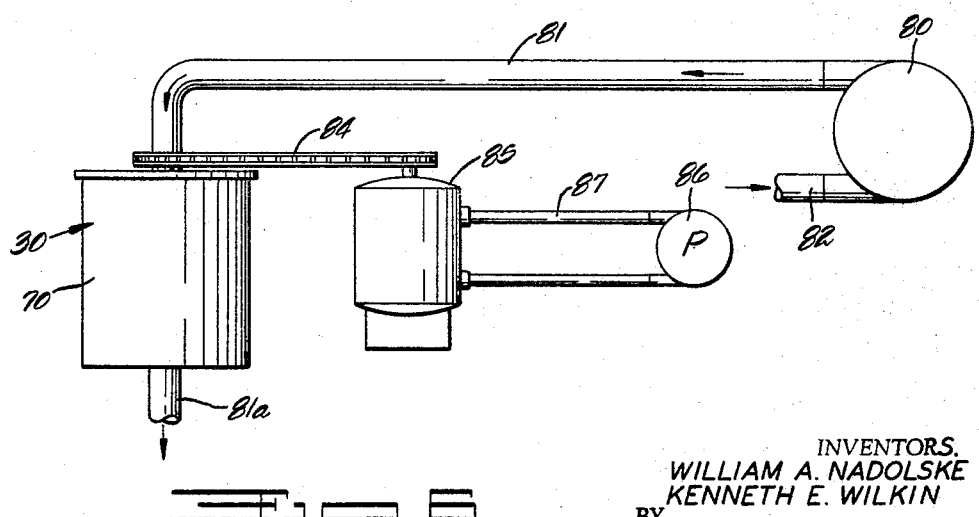

United States Patent Office 3,270,921
Patented Sept. 6, 1966

3,270,921
UNLOADING SYSTEM FOR BULK MATERIAL BINS
William A. Nadolske and Kenneth E. Wilkin, Newark, Ohio, assignors to Styron-Beggs Research Corporation, Newark, Ohio, a corporation of Ohio
Filed Dec. 13, 1963, Ser. No. 330,299
5 Claims. (Cl. 222—132)

This invention relates to unloading system for bulk material bins. It has to do, more particularly, with an unloading apparatus or system for use in unloading bulk material, such as loose granular material, from any selected one of a plurality of separate bins used in storing and/or transporting the material. Although the present invention will be described with reference to a vehicle in the form of a semi-trailer which supports a plurality of such bins for transportation, it is to be understood that the system is equally applicable to a plurality of storage bins carried by a fixed supporting structure.

In the illustrative embodiment disclosed herein, this invention comprises an unloading system in the form of an attachment to a semi-trailer vehicle and which includes a feeder-blower unit that is mounted on rails or tracks, which are a part of or are supported by the vehicle frame, beneath a plurality of material bins or containers having separate discharge outlets or spouts located at longitudinally spaced intervals along the rails. The feeder-blower unit, according to this invention, is mounted on a carriage that can be moved along the rails to selectively position the unit for cooperation with any of the bin discharge outlets or spouts. It is provided with adjustable means for readily connecting the unit to the selected spout with a fluid-tight seal and disconnecting it therefrom. The feeder blower unit is of the paddle wheel rotor type embodying a plurality of angularly spaced blades which provide material-receiving pockets therebetween which are rotated successively into association with the bin discharge outlet or spout to receive material therefrom. The filled pocket is then moved by rotation of the rotor to a position where the material therein is forced by pneumatic pressure from the pocket to a selected discharge point. The feeder-blower unit, according to this invention, so cooperates with the downwardly extended discharge spout of a bin that each time a pocket of the rotor which has been emptied of material moves into association with the spout, the remaining air pressure in the pocket provides an impulse of air into the spout which tends to prevent bridging or clogging of material therein.

In the accompanying drawings, there is illustrated one embodiment of this invention but it is to be understood that details may be varied without departing from basic principles of the invention.

In these drawings:

FIGURE 1 is a side elevational view showing a trailer carrying a plurality of bulk material bins and having the bin-unloading system of this invention on the semi-trailer.

FIGURE 2 is an enlarged side elevational view, partly broken away, of a portion of the semi-trailer structure shown in FIGURE 1, and showing in full and broken lines different positions to which the feeder-blower unit can be adjusted.

FIGURE 3 is an enlarged side elevational view of the feeder-blower unit of the system showing it in sealed coperation with the discharge spout of one of the bins and indicating how it may be disconnected from that spout.

FIGURE 4 is a horizontal sectional view taken along line 4—4 of FIGURE 3.

FIGURE 5 is a vertical sectional view taken along line 5—5 of FIGURE 4.

FIGURE 6 is a schematic view illustrating the driving arrangement for the rotor of the feeder unit and the pneumatic discharge arrangement for the feeder unit.

With reference to the drawings, this invention is shown applied in FIGURE 1 to a semi-trailer vehicle 10 which is pulled by a tractor 11. This semi-trailer vehicle is shown as including an elongated supporting frame 12 which carries a plurality of bulk material receiving bins 13. These bins may be of any suitable general construction, suitably mounted on the vehicle frame, and may be loaded through openings covered by removable or hinged lips 14. At least, some of these bins 13 have the tapered hopper bottoms 15 each of which converges into a central discharge outlet communicating with a depending discharge throat or spout 16. As indicated in FIGURE 2, these spouts 16 are longitudinally spaced along the trailer frame 12.

Each spout 16, as shown best in FIGURES 2, 3 and 5, is controlled by means of a gate valve 17. The spout 16 is preferably of square or rectangular cross section, as illustrated best in FIGURE 4. The gate valve 17 is in the form of a flat plate which extends through a transverse slot 18 in one wall of the spout 16 and is reciprocable therein. The other three walls of the spout are provided with the grooves or guides 19 for receiving the corresponding edges of the valve plate. The valve plate 17 is slidably mounted exteriorly of the spout in a pair of guides 20 which are carried by brackets 21 attached to the hopper bottom 15. The upper surface of the outer portion of the plate 17 carries a rack bar 22 with which a rack pinion 23 meshes. This pinion 23 is keyed on the inner end of a shaft 24 which is rotatably mounted by means including the bearing 25 that is carried by the frame 12 of the trailer.

As previously indicated, the bin-unloading system of this invention includes a feeder-unloader unit which is movable along the semi-trailer frame into cooperation with any of the discharge spouts 16 of the various bins 13. This unit is indicated generally by the numeral 30 in the drawings. It is movable longitudinally of the frame 12 of the semi-trailer, comprising a carriage 29 which operates on the longitudinally extending guide rails 12a that are mounted on or part of the trailer frame 12. The carriage 29 comprises the longitudinally extending side frame members in the form of angle bars 31 rigidly secured in parallel relationship by the transverse support bars or braces 32 and a motor-supporting plate 33.

The carriage 29, as shown in FIGURES 3 and 4, is supported at each of its ends by means of a pair of flanged wheels or rollers, those at the forward end being indicated by the numeral 41a and those at the rear end by the numeral 41. These wheels 41 and 41a operate on the opposed inwardly turned flanges of the guide rails or tracks 12a of the trailer frame 12. It will be apparent from FIGURE 4 that these inturned flanges have their inner ends disposed in parallel relationship and the flanges of the wheels cooperate with the inner edges thereof in guiding the carriage. The vertical adjustment of the wheels 41 and 41a relative to the carriage side members 31 is for the purpose of moving the carriage frame vertically relative to the guide rails 12a. This movement is for the purpose of adjusting the inlet or throat 40 of the unit 30 into sealed engagement with the selected outlet spout 16 of the bins 13, it being understood that the unit 30 is carried in a fixed position on the carriage. The adjustable mounting for the various wheels permits independent adjustment of each of the four wheels. Thus, the rear rollers 41 are carried by the brackets 42 which are pivoted to the outer vertical flanges of the side rails 31 of the carriage at the opposed pivot points 43 at the upper and rear corners of the brackets and which are on a common axis. The brackets normally depend below the members 31 and are swingable about the pivot points 43. Each bracket 42 is provided with an arcuate slot 44 which receives a guide pin or bolt 45 that is mounted in the flange of the associated member 31. Adjustment of either of the brackets 42 may be accomplished independently by swinging it about the pivot bolt 43 with the bolt 45 traveling in the arcuate slot 44. This will raise and lower the wheel 41, carried by that adjusted bracket, relative to the frame of the carriage.

Means is provided, as shown in FIGURES 3 and 4, for independently adjusting either of the brackets 42. This means comprises a connecting socket member 46 which is pivoted at 47 to the rear lower corner of the bracket 42 substantially in vertical alignment with the pivot 43. This member 46 has an outwardly opening threaded socket which receives the threaded inner end of an adjusting rod 48. The adjusting rod 48 is rotatably mounted in a bearing 49 positioned adjacent a bracket 51 which depends from the associated side member 31 of the carriage. The outer end of this rod extends through the bracket 51 and has a crank 50 keyed thereon by means of which it may be rotated. Obviously, rotating the rod 48 by means of the handle 50 will cause it to thread into or out of the socket member 46 and thereby swing the associated bracket 42 about the pivot 43. This will raise or lower the corresponding wheel 41 relative to the carriage frame. The same adjusting rod structure 48 is provided for each bracket 42 at the opposite sides of the carriage and, therefore, if both of these adjusted rods are operated, the rear end of the carriage will be raised or lowered relative to the guide rails or tracks 12a.

The adjusting mechanism for the wheels 41a at the forward end of the carriage frame may be similar to that provided for the wheels 41. The parts of this mechanism are indicated by the corresponding numerals with the suffix "a" and need not be described in detail. However, as shown, the brackets 42a, pivoted at 43, are clamped in adjusted position by means of the clamping bolts 45a extending through the arcuate slots 44a. Adjusting handles like the handles 50 are not shown but could be provided if desired. The adjustment of the wheels 41 and 41a at the four corners of the carriage frame not only provides for bodily vertical movement of the carriage frame, but also provides adjusting means to compensate for both lateral and longitudinal twisting of the guide frame relative to the bin outlet spouts.

In moving the upright inlet throat 40 into association with the depending spout 16, the carriage will be lowered, at least at its leading end, until the upper edge of the inlet 40 clears the lower edge of the outlet 16. It will be noted from FIGURE 5 that the upper edge of the inlet throat 40 carries a gasket or sealing ring 55 which has a chamfered or angled upper and inner corner. It will also be noted from FIGURE 4 that this inlet throat 40 is of the same rectangular outline as the depending discharge spout 16 but is slightly larger in cross section. Consequently, the gasket 55 will fit around and engage an inwardly tapered lower surface on a metal collar or band 56 which surrounds the lower end of the spout 16. A metal retaining band or collar 57 surrounds the upper end of the throat 40 and the sealing gasket 55 to keep it in position thereon. The sealing engagement between the members 40 and 16 will take place when the carriage is moved along on the guide rails 12a until the member 40 is directly below the member 16, it being understood that the wheels 41 at this time have been so adjusted, relative to the carriage, that the upper end of member 40 is at a sufficiently low position that it will clear the member 16 when moved therebeneath by movement of the carriage along the rails 12a. Then by adjusting the two handles 50, the inlet throat 40 will be raised into fluid-tight sealing engagement with the outlet spout 16. These adjustments will be clear from a comparison of the full and broken lines in FIGURE 3 and it will be understood that at this time the adjustment may be a vertical movement of the carriage frame about the axes of the wheels 41a. To move the unit 30 to a new location, it is merely necessary to actuate the handles 50 to adjust the wheels 41 to lower the one end of the carriage in order to break the seal between the cooperating members 40 and 16 and to clear the member 40 from the member 16. Then the carriage can be moved to position the throat 40 in cooperation with another depending discharge spout 16, as indicated by broken lines in FIGURE 2. The wheels 41a are adjusted only when frame distortions make this necessary.

The inlet throat 40 is also controlled by a slide valve which is similar to the valve 17. This slide valve, as shown in FIGURES 3, 4 and 5, comprises a flat plate 60 which is mounted for reciprocation in a slot 61 in one wall of the member 40 and in a guide member or block 62 fixed to the exterior of that wall and having an aligning slot. The three walls of the throat 40 are provided with the grooves 66 for receiving the corresponding edges of the valve member. For reciprocating this valve member, a screw 63 is provided which is rotatably mounted in an axially fixed position in a bearing 64 in the depending flange of the rear angle bar brace 32 of the carriage 29. The inner end of the screw 63 is rotatably mounted in a fixed axial position in the guide block 62 and its outer end is provided with the hand-wheel 65 by means of which it may be rotated. On the projecting outer end of the valve plate 60 is a depending block 67 which is fixed thereto. The threaded screw 63 passes through a complementally threaded opening in this block. Therefore, it will be apparent that rotation of the wheel 65 will move the valve plate 60 between its open or closed positions. It will also be apparent that the valve plate 60 projects inwardly in a direction opposite to that in which the valve plate 17 projects. Therefore, the discharge passages at the inner ends of the respective valve plates may be at opposite sides of the large passageway provided through the aligning members 40 and 16. This will produce an agitating and cleaning action since the discharging material will be caused to follow a tortuous or S-path as it passes through these members 40 and 16.

The feeder-unloader unit 30 comprises a cylinder 70 which is disposed with its axis horizontal and transversely below the carriage 29, as illustrated in FIGURES 3, 4 and 5. The cylinder is preferably supported in depending position from the carriage by means of the supporting brackets 71 (FIGURE 4) on opposite sides of the inlet throat 40. It will be noted that the cylinder 30 is just slightly longer than the transverse extent of the throat and that the cylinder ends are disposed laterally inwardly of the planes of the side member 31 of the carriage frame. One end of the cylinder 70 is preferably provided with a removable cover plate 72 so that access may be had to the interior of the cylinder when needed.

The cylinder contains the paddle wheel rotor 75 which is adapted to receive the material and separate it into relatively small charges. This rotor comprises the radially extending, angularly spaced blades 76 which provide successive material-receiving pockets 77 therebetween. Each blade 76 comprises opposed flat plates between which is clamped a flexible sealing plate or blade which projects radially outwardly and laterally from both sides of the clamping plates. Each radially projecting tip of the sealing member 78 will wipe against the interior of the peripheral wall of the cylinder 70 and the projecting side edges of the sealing member will wipe against the adjacent side walls of the cylinder to provide substantially fluid-tight contact of each blade structure with the walls of the cylinder. This will make each pocket 77 substantially fluid-tight as long as it is not in communication with an exterior passageway. An inlet 79 is provided in the lid end of the cylinder 70 adjacent the bottom side thereof.

The opening 79 is adapted to connect to the discharge or pressure side of a blower 80, which is shown in FIGURE 6, by means of a pipe 81. The opposite end wall of the cylinder is provided with an opening (not shown), similar to the opening 79, which communicates with an outlet pipe 81a that leads to a suitable point of discharge for the material. The blower is provided with an inlet pipe 82 that connects to the suction side of the blower 80. The blower 80 and the associated pipe may be on the trailer 10 or part may be on the tractor 11. The power unit for the blower (not shown) may be an independent power unit on the semi-trailer or a take-off from the power unit of the tractor.

The paddle-wheel rotor 75 is keyed to a drive shaft 83. This shaft 83 may be driven in any suitable manner such as by a chain and sprocket drive 84 from the hydraulic motor 85. This hydraulic motor 85 is preferably carried on the plate 33 (FIGURE 4) of the frame of the carriage 29. This hydraulic motor 85 may be driven from a suitable hydraulic pump 86 connected thereto by the lines 87 which may include flexible sections. The pump 86 may be, like the blower 80, located on the semi-trailer and be driven by an independent power source or may be located on the tractor 11 and be driven by a power take-off therefrom.

In the operation of this unloading system, assuming that both of the bin valves 17 are closed, the carriage 29 can be moved along the supporting frame 12 into association with the selected bin 13 to be emptied. The carriage can be adjusted, usually by operation of the cranks 50 only, to first lower the inlet throat 40 of the unit 30 to clear the discharge spout 16 of the particular bin so that the members 16 and 40 can be brought into substantial axial alignment. Then, by again operating the cranks 50, the carriage may be raised to bring the upper end of the member 40 in tight, sealing cooperation with the lower end of the member 16. The wheels 41 not only will be adjusted by the cranks 50 but will be held in adjusted position by the screw mechanism actuated thereby. During this raising movement of the carriage, slight longitudinal adjustment of the carriage on the guide rails 12a may occur as the members 40 and 16 move into cooperation. The motor 85 and the blower 80 are started. Then, the valve 17 is opened, the valve 60 having previously been opened to the required amount. The material will feed down through the members 16 and 40 in an S-path, as previously indicated, and will fill the successive pockets 77 of the continuously rotating rotor 75. The rotor will rotate in a counterclockwise direction (FIGURE 5) and will move these pockets successively into association with the continuous blast of air entering through the inlet 79 along the bottom of the cylinder 70. This blast of air will effectively move the small amount of material from that pocket through the outlet pipe 81a to a suitable point of discharge.

It will be apparent that the paddle wheel rotor 75 of the feeder-unloader unit 30 will divide the material discharged from the bin into relatively small amounts or charges upon which the blast of air can concentrate to discharge the material from the cylinder 70 and carry it to the desired location. Thus, the material will be discharged in successive small amounts or charges which can be handled more effectively. Some of the air will remain in each pocket 77 as it passes beyond the discharge blast of air and will remain therein until the tip 78 of that pocket moves upwardly and just reaches the inlet throat 40. At this instant, this small amount of air will rush up into the throat 40 and create a current of air, in opposition to the downward gravity discharge of material, which will serve to further agitate the material and prevent clogging or bridging in the throat 40. Due to the opposite disposition of the valve plates 17 and 60, the separation of the material into small charges before subjecting it to the discharge air blast, and the retention of some air in the pockets which successively acts upwardly on the material in the throat 40, the entire system is effectively self-cleaning. Also, due to the fact that the unit 30 can be moved readily into and out of association with any selected bin, the system is extremely simple since only one unit 30 is required for unloading any number of bins carried by the supporting frame on which the unit is mounted. The speed of the rotor 75 and the velocity of the air stream and the gate openings may be selectively varied to attain maximum unloading efficiency commensurate with the particular material being handled.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In combination with a supporting structure having a plurality of bulk material bins carried thereby with each having a downwardly extending outlet spout through which material will discharge therefrom, the discharge outlet spouts of the respective bins being disposed in spaced relationship along the supporting structure, an unloading unit mounted on said supporting structure for movement therealong into cooperative relationship with any of said outlet spouts, said unloading unit having an upwardly projecting inlet throat for connection to the cooperating downwardly extending outlet spout, and means on said unit for adjusting said throat on said unit into and out of connecting relationship, said means including guide wheels on said unit, guide rails with which said wheels cooperate for movably mounting the unit, and means for independently adjusting each wheel on said unit.

2. The combination of claim 1 in which each wheel is carried by a bracket pivoted to said unit for swinging movement, and said adjusting means includes a rotatable screw operatively connected between each of said brackets and said unit.

3. In combination with a supporting structure having a plurality of bulk material bins carried thereby with each of said bins having a downwardly extending outlet spout through which material will discharge therefrom, the outlet spouts of said bins being disposed in spaced relationship to one another along said supporting structure; and unloading unit mounted on said supporting structure for movement therealong into cooperative relationship with any of said outlet spouts, said unloading unit comprising a housing having an upwardly projecting inlet throat connectable with any one of said outlet spouts, and a paddle wheel rotor rotatably mounted in said housing beneath said inlet throat and defining a plurality of successive pockets to receive material from said throat, means connected with said housing for subjecting successive filled pockets of said rotor to a blast of air to remove material therefrom, air remaining in said successive pockets after removal of material therefrom acting upwardly in said throat on materials flowing downwardly therethrough; and means on said unloading unit for adjusting said inlet throat into and out of connecting engagement with each of said outlet spouts.

4. The combination defined by claim 3, wherein each of said outlet spouts and said inlet throat are provided with valve plates movable across the outlet spouts and the inlet throat, respectively, the valve plate of said inlet throat being movable in a direction opposite the direction of movement of the valve plates of said outlet spouts so as to cause materials flowing through said outlet spouts and said inlet throat to travel from one side to the other of the passage therethrough.

5. The combination defined by claim 3, including sealing means carried by said paddle wheel rotor for wiping engagement with said housing and providing a seal therebetween; and other sealing means disposed between said inlet throat and said outlet spouts and providing a seal therebetween.

References Cited by the Examiner
UNITED STATES PATENTS

| | | | |
|---|---|---|---|
| 1,889,663 | 11/1932 | Ilyus. | |
| 2,152,632 | 4/1939 | Cassiere | 222—194 X |
| 2,247,448 | 7/1941 | Morrow | 214—17.8 |
| 2,564,020 | 8/1951 | Mengel | 214—83.26 |
| 2,749,940 | 6/1956 | Bronson | 222—545 X |
| 2,799,407 | 7/1957 | Vanier et al. | 214—17.8 |

M. HENSON WOOD, Jr., *Primary Examiner.*

LOUIS J. DEMBO, *Examiner.*

F. HANDREN, *Assistant Examiner.*